US007767457B2

(12) United States Patent
Mun et al.

(10) Patent No.: US 7,767,457 B2
(45) Date of Patent: Aug. 3, 2010

(54) METHOD OF USE OF TAGGANTS

(76) Inventors: InKi Mun, 1 Apple Ct., Nanuet, NY (US) 10958; Allen B. Kantrowitz, 184 Shore Dr., Hinsdale, MA (US) 01235

( * ) Notice: Subject to any disclaimer, the term of this patent is extended or adjusted under 35 U.S.C. 154(b) by 1365 days.

(21) Appl. No.: 10/901,271

(22) Filed: Jul. 28, 2004

(65) Prior Publication Data

US 2005/0181511 A1 Aug. 18, 2005

Related U.S. Application Data

(60) Provisional application No. 60/537,769, filed on Jan. 20, 2004.

(51) Int. Cl.
*G01N 21/77* (2006.01)
*G01N 21/75* (2006.01)
*G01N 21/00* (2006.01)

(52) U.S. Cl. .......................................................... 436/56

(58) Field of Classification Search ................... 436/56, 436/57; 378/45, 44, 1; 252/408.1; 235/494; 713/166, 164, 150; 40/326; 340/572.6
See application file for complete search history.

(56) References Cited

U.S. PATENT DOCUMENTS

| | | | | |
|---|---|---|---|---|
| 4,359,399 | A * | 11/1982 | Boyars | 252/408.1 |
| 6,025,200 | A * | 2/2000 | Kaish et al. | 436/56 |
| 6,477,227 | B1 * | 11/2002 | Kaiser et al. | 378/45 |
| 6,490,680 | B1 * | 12/2002 | Scheidt et al. | 713/166 |
| 6,646,554 | B1 * | 11/2003 | Goff et al. | 340/572.6 |
| 6,647,649 | B2 * | 11/2003 | Hunt et al. | 40/326 |
| 2003/0141375 | A1 * | 7/2003 | Lawandy | 235/494 |

FOREIGN PATENT DOCUMENTS

WO WO 01/25747 * 4/2001

* cited by examiner

*Primary Examiner*—Walter D Griffin
*Assistant Examiner*—Christine T Mui
(74) *Attorney, Agent, or Firm*—Avery N. Goldstein

(57) ABSTRACT

An investigation process includes dispersing particulate taggants at a transit point with recordation of the transit point location. A subject passing the transit point has adhered to them at least one taggant from the transit point. Collection of the at least one taggant from the area of investigation allows an investigator to assign the location of the dispersal step to a path taken by the subject between the transit point and the area of investigation.

29 Claims, No Drawings

METHOD OF USE OF TAGGANTS

RELATED APPLICATION

This application claims priority of U.S. Provisional Patent Application Ser. No. 60/537,769 filed Jan. 20, 2004, which is incorporated herein by reference.

FIELD OF THE INVENTION

The present invention in general relates to physical investigation and in particular to a dispersal of taggants that identify the prior routes a subject traveled.

BACKGROUND OF THE INVENTION

Society has a growing concern to rapidly develop law enforcement leads in civil, criminal and terrorist acts in order to prevent subsequent acts. It is generally recognized that some form of broad surveillance methodology could help forensic investigators reconstruct the movement patterns of the subjects prior to arrival at the scene to be investigated. Reconstruction of such movements helps investigators to identify workshops, other supporting facilities, or modes and routes of transportation used by the subjects. These problems of rapidly uncovering such sites are made all the more pressing with concerns about terrorism.

Forensic investigative planners must make decisions regarding geographic areas to be targeted by surveillance methods. When significant knowledge of the subjects' movement patterns is already known, highly localized conventional surveillance methods can be continuously deployed to a few transit points. Absent detailed foreknowledge of the subjects' movement patterns, many more transit points must be monitored. In some cases, the investigators have no localizing information and might be forced to consider an entire community along with its transport network to be potential targets for surveillance. It is for such extreme situations that ubiquitous surveillance may be considered useful. If implemented with street level cameras, hundreds or thousands of cameras might be considered. However, civil liberty concerns and the high cost of supporting complete area surveillance preclude such systems from most areas. Continuous wide area aerial surveillance from circling manned or unmanned aircraft has been proposed as an alternative. However, the ability of aerial cameras to reliably trace vehicular movements can be questioned and the ability to trace pedestrians may be extremely problematic.

Particulate taggant technologies, ranging in size from atomic to macroscopic, are rapidly evolving as covert and overt means of verification of manufactured identification product and a broad range of other items. A particulate taggant can be understood to be any reliably recognizable small object that can be dispersed within or applied onto a large object without changing the general behavior of the large object. The physical basis of the reliable recognition of the small object can be variously based on, by way of example, distinctive compositions, color, or codes and evaluated through a variety of techniques including, but not limited to spectroscopy and microscopy. Heretofore, particulate taggants were affixed to products and items at the time of manufacture or storage by directly admixing the particles in bulk materials, such as explosive powder taggants, liquid product taggants, coating taggants to be applied as a finish to manufactured products, or directly affixed to products and items by adhesives, fasteners and the like.

Frequently arising during forensic investigations is the problem of determination of the route used by the subjects to reach the scene of forensic interest. Thus, there exists a need for a method by which particulate taggants are used forensically to understand movement patterns of a subject leading up to an incident of interest.

In the field of wide-area surveillance there exists a need for a method based on the dispersal and passive transport of particulate taggants throughout an area of interest.

SUMMARY OF THE INVENTION

An investigation process includes dispersing particulate taggants at a transit point with recordation of the transit point location. A subject passing the transit point has adhered to them at least one taggant from the transit point. Collection of the at least one taggant from the area of investigation allows an investigator to assign the location of the dispersal step to a path taken by the subject between the transit point and the area of investigation.

In a preferred embodiment, recordation of a time of the dispersal step is also recorded.

A simple form of investigative process entails pre-labeling the multiple particulate taggants prior to dispersion at the transit point with a common label value.

A passive taggant particle is detailed that includes a label space such as an RFID tag, a one-dimensional barcode and a two-dimensional barcode. The particle label space is coated with an encapsulant to protect the label space and the value recorded therein from environment degradation. The taggant is amenable to modifications in order to modify analytical properties as well as adhesion characteristics towards a passing subject.

DETAILED DESCRIPTION OF THE INVENTION

A method of use of particulate taggants to aid investigation of subjects including people, animals, vehicles and other objects is provided. The physical basis of the recognition and encoding of taggant particles is well known in the art as embodied in U.S. Pat. Nos. 5,760,394; 6,610,351; 5,451,505; 4,053,433; 6,647,649; and 6,646,554, which are incorporated herein by reference. An inventive method is detailed by the following use of taggants in criminal investigations as an exemplary sequence of steps. However, it is appreciated that this setting for the use of the present invention is only exemplary and that the present invention has utility in settings as diverse as studying traffic flow patterns, wildlife biology, consumer behavior, and dispersal modeling of pollutants, biocides and the like. While the present invention is detailed hereafter with respect to forensic investigations, it is appreciated that the invention is equally well suited in the other enumerated useful arts.

Step 1: A forensic investigator identifies a geographic region, hereafter referred to as the "target area" that is the subject of area-wide surveillance. Within the target area, a specific set of geographic locations, hereafter referred to as "transit points", are identified based on considerations detailed below. Some investigations may involve a large geographic area with a large number of transit points.

Step 2: The forensic investigator identifies the overall time frame for which the wide-area surveillance is to be maintained, in addition to technical factors detailed below, in order to identify specific points in time which are of potential future forensic interest, hereafter referred to as "time points". Some investigations may be ongoing, thereby implying a large number of time points.

Step 3: Taking into consideration the number of transit points multiplied by the number of time points, in addition to technical factors detailed below, the investigator is then able to estimate the information content or "label space" for a taggant used according to the present invention. A taggant with a suitable label space and suitable physical and adhesive properties is then selected.

Step 4: At each time point, suitable taggants are then dispersed into the environment at each transit point. The actual method of dispersal is not critical and includes dispersal methods conventional to the art. As a result of the physical and adhesive properties of the taggant particles, some adhere to a subject traveling through the transit point. The particulate taggants are then passively transported by the subject in the course of the subject's movement.

Step 5: In the event of a crime, an investigator examines physical evidence found at the crime scene and recovers taggants adherent to the physical evidence. For example, a subject may shed taggants onto contacting materials and surfaces or subject pieces may be left at the scene. Techniques to locate taggant particles on physical evidence are well known to the art and could comprise, by way of example, radiofrequency, fluorescent or magnetic elements incorporated into the taggant particles. Techniques to read taggant label values are also well known to the art and could comprise, by way of example, radiofrequency, fluorescent, optical, holographic, electronic, magnetic, or nanomanufactured label elements incorporated into the taggant particles.

The correlation of taggants with the original time and place of taggant dispersal is proved from a taggant dispersal log. The actual method of reading taggant label values is not critical and is dictated by the nature of the taggant. The method of correlation with original dispersal information is not critical and is dictated by the nature of the taggant log. Since only the actual physical evidence at the scene of interest is analyzed, civil liberty concerns are addressed and an investigator is provided with probable cause to follow up on subjects having similar taggant patterns. An investigator is thus able to deduce movement patterns of the subject leading up to the incident being investigated.

Hereafter, the act of dispersing particulate taggants with known label values at a single known geographic location at a single known point in time will be referred to as "labeling a transit point". Hereafter, multiple acts of labeling of transit points, each location with its own known respective label value and known respective point in time, will be referred to as "labeling a target area".

Step 1: Identification of Target Area and Transit Points

An investigator identifies a geographic region warranting surveillance and then chooses appropriate transit points within the target area. Ultimately, the distance and/or time stamping between adjacent transit points limits the investigatory power of the inventive method. Typically, transit points are placed at intersections of streets, thereby localizing a subject's movements within a finite area. It is appreciated that spacing between adjacent transit points need not be uniform. The diffusion coefficient of taggants is recognized to be anisotropic, in most instances based on traffic flow differences through an intersection. Through a sampling experiment, these diffusion coefficients are readily modeled and compensated for in subsequent labelings. Furthermore, the investigators may consider some neighborhoods as warranting a low index of suspicion; such neighborhoods might be labeled only at streets as they cross the perimeter of the neighborhood. As detailed below, the labeling of a target area may need to be repeated at successive time points. There is no requirement that the distribution of transit points be replicated with each re-labeling of the target area; information gained over the course of the investigation can be used to alter and iteratively refine the distribution of transit points.

Step 2: Identification of Time Points

Preferably, an investigator identifies the overall time frame over which the labeling of the target area is performed. A single use series of transit points is used or alternatively, time interval labelings occur in specific portions of a target area in recognition of the local taggant coefficient diffusion. It is appreciated that in the same way that the spatial separation between two adjacent transit points limits the spatial resolution of the surveillance, the time interval between successive labelings of a transit point limits the temporal resolution of the surveillance.

An additional factor to be taken into consideration in deciding the location and timing of labeling of individual transit points is the process of secondary redistribution that occurs after the primary dispersal. Specifically, particulate taggants initially adhere to a subject and, rather than the desired continued adherence until the scene of forensic interest, it may be the case that taggants will be subject to secondary release at random locations with possible subsequent re-adherence to other passing subjects. Such processes, subject to a host of local factors including traffic density and adhesive characteristics of the particulate taggants, serve to broaden and thin the original labeling of an individual transit point. Field sampling is preferably used to monitor the magnitude of the secondary redistribution and could help refine planning of the re-labeling of the target area as well as the forensic analysis of taggant information recovered from a crime scene.

Step 3: Choice of Particulate Taggant

Taking the above into consideration, one preferred embodiment of the invention involves particulate taggants possessing a label space such as can be found in RFID tags, such as the 96-digit addresses, and both one and two-dimensional barcodes or an inventive optical identification tag as detailed in co-pending applications 60/544,712 filed Feb. 13, 2004 and 60/558,629 filed Apr. 1, 2004, the contents of which are incorporated herein. A particulate taggant operative herein also is formed by microprinting a taggant identifier onto a sheet substrate such as thermoplastic sheeting followed by shredding the substrate to a particulate. Holographic printing is considered as a preferred embodiment of microprinting.

A sheet is appreciated to be operative with duplicate or unique label values printed thereon. The individual tags derived from the sheet while preferably containing a label value, remain operative with a partial label value. Additionally, further information content is provided by varying the cutting edge to create a taggant edge artifact including various indentations, nicks, or oscillations that are ascribable to a particular batch of taggants or a time of shredding. Since there is no requirement that taggant label values be assigned in consecutive sequence, a large label space optionally serves to support encryptation, error detection and error correction methodologies as well as to suppress counterfeiting of taggant labels in that only a tiny fraction of the available label values will be used, and therefore would be considered valid, in any single investigation. It is appreciated that in a simplified version, all taggants label values are the same and only a single transit point is so labeled.

A variety of taggant dispersal methods are employed according to the present invention. In a preferred embodiment of the method, the particulate taggants are dispersed onto the surfaces of subject travel. As a subject vehicle or pedestrian passes through the transit point, taggant particles will adhere to tires, shoes and the like, and remain adherent during further travels. In a second preferred embodiment, the particulate taggants are directly applied to the surface of a subject, in the instance of a subject vehicle as it is parked on the street or as it passes by a street-side dispersal mechanism, and remain adherent during further travels. There is no requirement that only one single mode of dispersion and adhesion be used according to the present invention. Factors relevant in determining physical and adhesive properties of the particulate taggant appropriate for use in the field illustratively include the knowledge regarding the subject identity and/or travel patterns, the desire for clandestine tagging, the duration of the tagging, adherence properties of the taggant, and the like.

It is appreciated that the physical and adhesive properties of the particulate taggant optionally are augmented by encapsulation in plastic, glass or some other material. For example, after such encapsulation, the taggant particles could have the size and appearance of tiny pebbles as would be commonly found in the street and would commonly become lodged in the tread pattern of a subject vehicular tires. They would then be judged by the investigator to have physical and adhesive properties appropriate for use in the field and the particulate taggants can then be dispersed into the environment as detailed below.

An encapsulant particulate taggant optionally is further modified as to texture and/or adhesive properties. For example, the surface of the particles is modified to have microscopic barbs reminiscent of those on plant pollen, plant seeds or insect feet, thereby remaining adherent to soft textured surfaces; or the surface of the particles is coated with conventional pressure adhesives to improve the adherence to subject surfaces. In another embodiment, the surface of the particles is coated with adhesives that are further encapsulated in such a manner that the adhesive is exposed or activated only after forces are exerted to rupture the encapsulant. Other surface modifications and combinations of such are possible.

An encapsulated particulate taggant optionally is further modified with respect to magnetic properties. A particular taggant that is ferromagnetic is adherent to ferromagnetic portions of subjects.

It is appreciated that taggant particles are operative herein that individually have a variety of modifications relating to adhesion, ferromagnetism, spectroscopic properties and encapsulants and that such differently modified particles are co-dispersed at the same or different transit point in combination.

Step 4: Dispersal of Particulate Taggants

Various techniques and combinations of techniques are used to disperse particulate taggants into the target area. Common to all operative techniques is some way of maintaining a log or computer database, or an informational equivalent, so as to permit correlation of time and place of original dispersal of particulate taggants with label values of those respective taggant particles. The log may be maintained in a centralized or a decentralized fashion. Equivalently, information regarding geographic location and time of original dispersal could be written, preferably in an encrypted form, directly on to the label of the particulate taggant at the time of dispersal.

Conventional GPS receivers provide both accurate spatial information as well as time information. Other geographic mapping systems and naming conventions could be used equivalently. Regardless of the source of geographic and temporal information, a methodology is provided for entering the information concerning dispersal into the log, along with the label values of the respective taggant particles, or along with the label values of batches of taggant particles. In the case when batches are being used, the batch label values preferably serve to link batches of particle label values together in the log.

Label values optionally are assigned to individual taggant particles at the moment of geographic dispersal or, alternatively, are assigned to individual taggant particles prior to the moment of geographic dispersal such as at the time of manufacture or at some intermediate time. In one preferred embodiment, for practical convenience at the moment of distribution, batches of taggant particles with recorded label values are prepared prior to field dispersal. Additional information is available when like labeled taggant parties at a point of distribution are coated with a first spectroscopically identifiable dye as a method of time stamping, with another spectroscopically dye discernable from the first dye defining the close of a first time stamping window. Such batches optionally are variously stored in canisters that are mounted on a long belt, or a chain, in a fashion reminiscent of an ammunition cartridge belt. Each canister is itself labeled, for example variously with an optical barcode tag or an RFID tag, or an inventive optical identification tag as detailed in U.S. Patent Application Publication US 2005/0258939, the contents of which are incorporated herein, and is distributed at a single transit point. The label value of the distribution canister allows correlation of data specifying individual taggant particle label values, pre-recorded at the time of loading of the canister with taggant particles, with dispersal data regarding the time and location of use of a given canister as a method of dispersal of taggant particles at a specified transit point. Alternatively, storage bins are placed on the taggant distribution vehicle as long as provisions are made to allow reading of the labels of pre-labeled taggant particles as they are dispersed or, alternatively, of writing label information onto the taggant particles as they are dispersed. Alternatively, a continuous ribbon or tape dispenser carries taggant particles or groups of taggant particles in association with a device to read and/or write individual or batch label values as dispersion occurs. Note that in such alternative dispersal modes, the effective size of a transit point is reduced to the spatial resolution of the geographic coordinate system.

The technique of carrying and dispersing the taggant particles is not critical to the method; the technique of recording label values of particles distributed at a transit point is not critical to the method.

In an alternative distribution mode, distribution vehicles may carry one or more varieties of taggant particles with respect to physical and adhesive properties. A log is kept as to the time and location of the release of a given taggant particle. The delivery vehicle illustratively includes cars, trucks, delivery vans, taxicabs, animal carts, motorcycles and bicycles. It is appreciated that a vehicle common to the target area affords a covert taggant broadcasting ability. Optionally, the global positioning satellite (GPS) or another geographic information and time system serves both as the basis for the taggant dispersal log as well as the means of directing the driver of the dispersal vehicle along routes envisioned by the investigatory planners to reach successive transit points. For example, a dispersion vehicle releases a discrete unit of taggants with GPS coordinates and time being noted. This serves to limit the zone of a transit point by labeling in proximity to a subject. The small size and the ability to disperse taggants according to the present invention as a dust, ribbon, or other forms allows for clandestine tagging of a subject.

In an alternate embodiment, a pedestrian operates to broadcast taggant particles for labeling one or more than one transit point.

In an alternate embodiment, an aircraft, manned or unmanned, operates to broadcast taggant particles for labeling one or more than one transit point.

It is appreciated that other modes of dispersal are possible. For example, a street-side dispersal mechanism is integrated into immobile roadside structures such as overpasses, traffic lights, manhole covers, in-road placement and the like, or is integrated into mobile roadside structures such as parked or moving dispersal vehicles and the like. A sensor or equivalent mechanism is optionally provided which senses a subject as it passes with the field of view of the dispersal mechanism and triggers the aerosolized release of taggant particles which would then become adherent to the surface of said subjects and remain adherent during further travels.

There is no requirement that only one mode of dispersal be used in an investigation. An investigative planner is free to select different modes of dispersal to use over the course of a single investigation.

Step Five: Recovery and Geographic Correlation of Taggant Particles from a Crime Scene A highly detailed examination of the surface of the area of investigation and subject parts found there is then performed either directly in the field or, subsequently, in a controlled laboratory environment. The detailed examination of the surface of the area and subject parts found there serves to identify and retrieve taggant particles. This process of identification and retrieval of taggant particles is assisted if the physical properties of the taggant particles have been augmented in such a fashion, for example by radiofrequency optical, fluorescent, magnetic or some other prior art means, as to enable the detection of the particle by non-contact methods.

Having physically isolated one or more taggant particles from the items of forensic interest, the investigators are then able to analyze the taggant particles and retrieve their label values. Note that in the prior art commercial applications of tags, there is a strong practical imperative to provide for rapid reading of the taggant label values. In contrast, the forensic applications envisioned in this patent do not suffer for a lack of ease in reading the label values. In other words, the constraints on the physical and adhesive properties of the particles imposed by the forensic applications are strong constraints. It is anticipated that in a forensic setting only a relatively small number of taggant particles will be recovered from the investigation area. Hence, techniques of reading taggant label values that require direct microscopic manipulation and reading by direct contact or microscopic examination do not unduly burden the overall forensic investigation process.

In an exemplary reading mode, individual taggant particles are placed on the stage of an optical or electron microscope and a microprobe with integral electrodes is advanced with a micromanipulator to make physical and electrical contact with contact pads on the taggant particle. The label value of the taggant particle is then electronically read.

In another reading mode, individual taggant particles are placed on the stage of an optical or electron microscope and an optical probe is aimed with a micromanipulator, or equivalent means, to make optical contact with the taggant particle. The label value of the taggant particle is then electro-optically read.

In yet another reading mode, individual taggant particles are placed on the stage of an optical or electron microscope and an electron beam probe is aimed with a micromanipulator, or equivalent means, to make contact with the taggant particle. The label value of the taggant particle is then read.

In still another reading mode, individual taggant particles are placed on the stage of an optical or electron microscope and an optical probe is aimed with a micromanipulator, or equivalent means, to make optical contact with the taggant particle. The label value, encoded as a miniature optical barcode, hologram or equivalent high density system of recording large numbers, is then electro-optically read. In still yet another reading mode, individual taggant particles contain an RFID transponder which reports the label value. These taggant reading modes are illustrative and do not intend to be a limitation on the practice of the invention.

Having retrieved label values of taggant particles from the investigation area, an investigator then uses the computer database and log to retrieve the original time and location of environmental dispersal of discovered area taggant particles. These locations and times can then be mapped by various manual, semi-manual or automated methods. Allowance preferably is made for mixing and secondary redistribution, as detailed above. The maps so obtained are then optionally used to iteratively refine re-labeling of the target area or can be the basis of further forensic investigations.

By way of example, the present invention is used to track consumer behavior within a retail establishment without resort to human or video surveillance. A transit location is established at a store entrance and/or other locations at which a passing subject collects a number of taggant particles having a time stamp associated therewith. In the vicinity of various displays or entryways within the establishment, light tack collection mats are provided to adhesively bind taggants from the subject. After a predetermined amount of time, the adhesive mats are removed and tallied for the subject time stamped taggant. The total taggant number count from a time stamped subject on a given mat provides information about the efficiency of the collection technique that is useful in modifying taggant quantity and labeling methods. An initial mat collection procedure taken at various time intervals and at least one other subject within the establishment and having a different time stamp labeling is helpful in calculating the taggant diffusion rates between the subjects and likewise is helpful in refining movement pattern data. Information relating to subject movement patterns is collected from the taggants found on the various mats. Coupling this information with that from other consumer subjects offers a retailer anonymous behavioral information without resorting to intrusive techniques that may influence consumer subject behavior.

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

In view of the teaching presented herein, other modifications and variations of the present invention will readily be apparent to those of skill in the art. The discussion and description are illustrative of some embodiments of the present invention, but are not meant to be limitations on the practice thereof. It is the following claims, including all equivalents, which define the scope of the invention.

The invention claimed is:

1. A process of investigation comprising the steps of:

dispersing at a transit point a first plurality of particulate taggants;

recording a location of said dispersal step;

allowing sufficient time for at least one taggant of said first plurality of taggants to adhere to a subject passing said transit point;

collecting the at least one taggant from an area of investigation passively shed from the subject; and assigning the location of the dispersal step to a path taken by the subject between said transit point and said area of investigation.

2. The process of claim 1 further comprising the steps of recording a time for said dispersal step.

3. The process of claim 1 wherein said first plurality of particulate taggants share a common label value.

4. The process of claim 3 further comprising the step of pre-labeling said first plurality of particulate taggants prior to dispersion at said transit point.

5. The process of claim 2 wherein said first plurality of particulate taggants each having a prerecorded label value are dispersed from a container at the time of the dispersal.

6. The process of claim 5 wherein said container is selected from the group consisting of: a canister, a storage bin, a continuous ribbon, and a tape dispenser.

7. The process of claim 2 wherein recordation of the time and the location of said dispersal step is logged on said first plurality of particulate taggants.

8. The process of claim 1 wherein recordation is performed with global positioning satellite data to determine the location.

9. The process of claim 1 wherein said at least one taggant comprises an RFID tag.

10. The process of claim 1 wherein said at least one taggant comprises an optical identification tag.

11. The process of claim 1 wherein said at least one taggant is encapsulated.

12. The process of claim 10 further comprising an adhesive.

13. The process of claim 1 wherein said at least one taggant is ferromagnetic.

14. The process of claim 1 wherein said at least one taggant is spectroscopically labeled.

15. The process of claim 1 further comprising the step of dispersing at said transit point after the dispersal step a second plurality of particulate taggants.

16. The process of claim 15 wherein said second plurality of particulate taggants share a common label value.

17. The process of claim 16 further comprising the step of pre-labeling said second plurality of particulate taggants prior to dispersion at said transit point.

18. The process of claim 15 wherein said second plurality of particulate taggants each having prerecorded label value are dispersed from a container at the time of the dispersal.

19. The process of claim 1 further comprising dispersing at a second transit point a second plurality of particulate taggants.

20. The process of claim 18 wherein said container is sited at a position selected from the group consisting of: a thoroughfare surface, a stationary vehicle, and an immobile roadside structure.

21. A process of investigation comprising the steps of:

dispersing at a transit point a first plurality of particulate taggants;

recording a location of said dispersal step;

allowing sufficient time for at least one taggant of said first plurality of taggants to adhere to a subject passing said transit point;

collecting the at least one taggant from an area of investigation passively shed from the subject;

assigning the location of the dispersal step to a path taken by the subject between said transit point and said area of investigation;

recording a time for said dispersal step, wherein said first plurality of particulate taggants share a common label value; and pre-labeling said first plurality of particulate taggants prior to dispersion at said transit point.

22. The process of claim 21 wherein said first plurality of particulate taggants each having prerecorded label value are dispersed from a container at the time of the dispersal.

23. The process of claim 22 wherein said container is selected from the group consisting of: a canister, a storage bin, a continuous ribbon, and a tape dispenser.

24. The process of claim 21 wherein recordation is performed with global positioning satellite data to determine the location.

25. The process of claim 21 wherein said at least one taggant comprises an optical identification tag.

26. The process of claim 21 further comprising the step of dispersing at said transit point after the dispersal step a second plurality of particulate taggants.

27. The process of claim 26 wherein said second plurality of particulate taggants share a common label value.

28. The process of claim 27 further comprising the step of pre-labeling said second plurality of particulate taggants prior to dispersion at said transit point.

29. The process of claim 26 wherein said second plurality of particulate taggants each having prerecorded label value are dispersed from a container at the time of the dispersal.

* * * * *